(12) United States Patent
Lan et al.

(10) Patent No.: US 11,958,189 B2
(45) Date of Patent: Apr. 16, 2024

(54) SINGLE-LAYER THREE-SECTION RAIL-TYPE PLANAR ROBOT CONTAINING A DOUBLE PARALLELOGRAM

(71) Applicant: Shandong University of Technology, Zibo (CN)

(72) Inventors: Yubin Lan, Zibo (CN); Jinliang Gong, Zibo (CN); Yanfei Zhang, Zibo (CN); Wei Wang, Zibo (CN)

(73) Assignee: SHANDONG UNIVERSITY OF TECHNOLOGY, Zibo (CN)

( * ) Notice: Subject to any disclaimer, the term of this patent is extended or adjusted under 35 U.S.C. 154(b) by 0 days.

(21) Appl. No.: 18/220,305

(22) Filed: Jul. 11, 2023

(65) Prior Publication Data
US 2023/0347507 A1   Nov. 2, 2023

Related U.S. Application Data

(63) Continuation of application No. PCT/CN2021/108820, filed on Jul. 28, 2021.

(30) Foreign Application Priority Data

Jan. 12, 2021 (CN) .......................... 202110038354.5

(51) Int. Cl.
*B25J 9/00* (2006.01)
*B25J 9/10* (2006.01)
*B25J 17/02* (2006.01)

(52) U.S. Cl.
CPC ............. *B25J 9/1065* (2013.01); *B25J 9/003* (2013.01); *B25J 9/104* (2013.01); *B25J 17/0258* (2013.01)

(58) Field of Classification Search
CPC ........ B25J 9/003; B25J 9/0033; B25J 9/0036; B25J 9/1065
See application file for complete search history.

(56) References Cited

U.S. PATENT DOCUMENTS

| | | | |
|---|---|---|---|
| 6,557,235 B1 * | 5/2003 | Katz ........................ | B23Q 7/04 414/749.6 |
| 10,501,208 B2 * | 12/2019 | Whitlaw .............. | B25J 11/0075 |
| 2019/0118373 A1 * | 4/2019 | Jeong ..................... | B25J 9/1623 |

FOREIGN PATENT DOCUMENTS

| | | | | |
|---|---|---|---|---|
| CN | 109227519 A | * | 1/2019 | ............. B25J 9/003 |
| CN | 107877492 B | * | 7/2020 | ............. A61B 34/70 |

* cited by examiner

*Primary Examiner* — Bobby Rushing, Jr.
(74) *Attorney, Agent, or Firm* — WPAT, P.C

(57) ABSTRACT

A single-layer three-section rail-type planar robot containing a double parallelogram, is composed of a stationary platform, a motion platform and three branched chains with the same structure connecting the stationary platform and the motion platform, the stationary platform is provided with three planar curved rails, each planar curved rail is connected to the motion platform through a branched chain, and each branched chain includes a slider, two link bars I arranged in parallel, two link bars II arranged in parallel, and link bar III, select one revolute joint I in each branched chain to form three revolute joints I as the main driving joint or three sliders as the driving parts.

4 Claims, 3 Drawing Sheets

SINGLE-LAYER THREE-SECTION
RAIL-TYPE PLANAR ROBOT CONTAINING
A DOUBLE PARALLELOGRAM

TECHNICAL FIELD

The present invention relates to the field of robotics, and in particular, to a single-layer three-section rail-type planar robot containing a double parallelogram.

BACKGROUND

Parallel robots are characterized by high stiffness, high load capacity, high precision, low motion load, and easy inversion, and are therefore widely applied to aspects such as motion simulators, virtual-axis machine tools, motion sensing simulators, medical devices, and agricultural work robots.

For the research of three-degree-of-freedom robots, many scholars have carried out a lot of work. Based on a 3-RRR parallel robot, YU Yueqing proposed an experimental apparatus of a planar parallel robot with three flexible hinges. The apparatus can enable a moving platform of the mechanism to implement movements in an X-axis direction and a Y-axis direction and a rotation around a Z-axis direction. Here successfully integrated a three-degree-of-freedom translational parallel robot such as a 3-RRC parallel robot based on the theory of Lie group and Lie algebra. Based on the spiral theory principle, HUANG Zhen provided an integration method of a low degree of freedom parallel robot including various three-degree-of-freedom translational parallel robots. LI Qinchuan used the screw theory to perform systemic integration of a symmetrical three-degree-of-freedom parallel robot. Based on the GF set theory, GAO Feng integrated various symmetrical and asymmetrical three-degree-of-freedom translational parallel robots with novel structures. In the year 2011, CHEN Fengming et al. provided a novel two-translation and one-rotation RRR-URR-RR parallel robot, analyzed movement output characteristics of this mechanism, calculated degrees of freedom, and established direct and inversion equations for the parallel robot. In the year 2016, ZHU Wei et al. from Changzhou University invented a two-translation and one-rotation parallel robot, and used three active moving kinematic pairs to drive a movable platform to move, to implement two-dimensional translation and one-dimensional rotation in space. In the year 2018, LI Yanwen et al. from Yanshan University provided a two-translation and one-rotation 2RRR-CRR parallel robot. The mechanism only includes sliding pairs and revolute pairs (a cylindrical pair is formed by a sliding pair and a revolute pair), and mostly revolute pairs are used, so that the mechanism has a simple structure and axial relationships are easily met.

Although scholars from home and abroad have provided many three-degree-of-freedom robot configuration schemes, planar three-degree-of-freedom robots have different performance requirements in different application fields. Therefore, it is of great significance for type selection by researchers in the art to provide as many as possible robot configuration types with two translational degrees of freedom and one rotational degree of freedom.

SUMMARY

A technical problem to be resolved by the present invention is to provide a single-layer three-section rail-type planar robot containing a double parallelogram to overcome deficiencies in the prior art. The robot has a novel structure and has two translational degrees of freedom and one rotational degree of freedom.

This scheme is implemented by using the following technical measures: a single-layer three-section rail-type planar robot containing a double parallelogram, is composed of a stationary platform, a motion platform and three branched chains with the same structure connecting the stationary platform and the motion platform, the stationary platform is provided with three planar curved rails, each planar curved rail is connected to the motion platform through a branched chain, and each branched chain includes a slider, two link bars I arranged in parallel, two link bars II arranged in parallel, and link bar III, the slider is connected with a planar curved rail in a sliding mode, the slider is connected with one end of the two link bars I by revolute joint I, the other end of the two link bars is connected with the link bar III by revolute joint II, both ends of the link bar III are connected with the two link bars II by revolute joint II, and the other end of the two link bars II is connected with the motion platform by revolute joint III; in a branched chain, the distance between the revolute joint I and the revolute joint II connected at both ends of one link bar I is equal to that between the revolute joint I and revolute joint II connected at both ends of the other link bar I and the distance between the revolute joint II and the revolute joint III connected at both ends of one link bar II is equal to that between the revolute joint II and the revolute joint III connected at both ends of the other link bar II; the axes of the six revolute joints I are parallel to each other, all perpendicular to the plane of motion of the slider relative to the planar curved rail; the axes of the six revolute joints II are parallel to each other, perpendicular to the plane of motion of the slider relative to the planar curved rail; the axes of the six revolute joints III are parallel to each other, perpendicular to the plane of motion of the slider relative to the planar curved rail I; select one revolute joint I in each branched chain to form three revolute joints I as the main driving joint or three sliders as the driving parts; three planar curved rails are arc-shaped, with different circle centers.

Preferably, the three plane of motions of the three sliders respectively relative to the three planar curved rails are the same plane or parallel planes.

Compared with the prior art, the advantages of the present invention are as follows: three planar curved rails are introduced into a stationary platform, and are used in combination with slider, revolute joint I, link bar I, revolute joint II, link bar II, link bar III and revolute joint III, so that it is ensured that a robot has a movement feature of two translational degrees of freedom and one rotational degree of freedom, and operation space can be increased at specific degrees of freedom by independently increasing the lengths of rails and/or the length of the link bar I and/or link bar II, thereby improving the flexibility of robot design; the slider, two link bars I arranged in parallel and the link bar III may form a parallelogram structure. Specifically, rotational connecting points of the two link bars I, the slider and the link bar III are four vertexes of a parallelogram, the motion platform, two link bars II arranged in parallel and the link bar III may form a parallelogram structure. Specifically, rotational connecting points of the two link bars II, the motion platform and the link bar III are four vertexes of a parallelogram, so that the movement is stable; in addition, in the structure, select one revolute joint I in each branched chain to form three revolute joints I as the main driving joint or three sliders as the driving parts, thereby improving the flexibility of selecting a robot driving manner.

As can be seen, compared with the prior art, the present invention has prominent substantial characteristics and significant progress, and the implementation of the present invention has obvious beneficial effects.

BRIEF DESCRIPTION OF DRAWINGS

For clearer descriptions of the technical schemes in the present invention, the following briefly introduces the accompanying drawings required for description. Apparently, the accompanying drawings in the following description show merely some embodiments of the present invention, and a person of ordinary skill in the art may still derive other drawings from these accompanying drawings without creative efforts.

Figure 1:
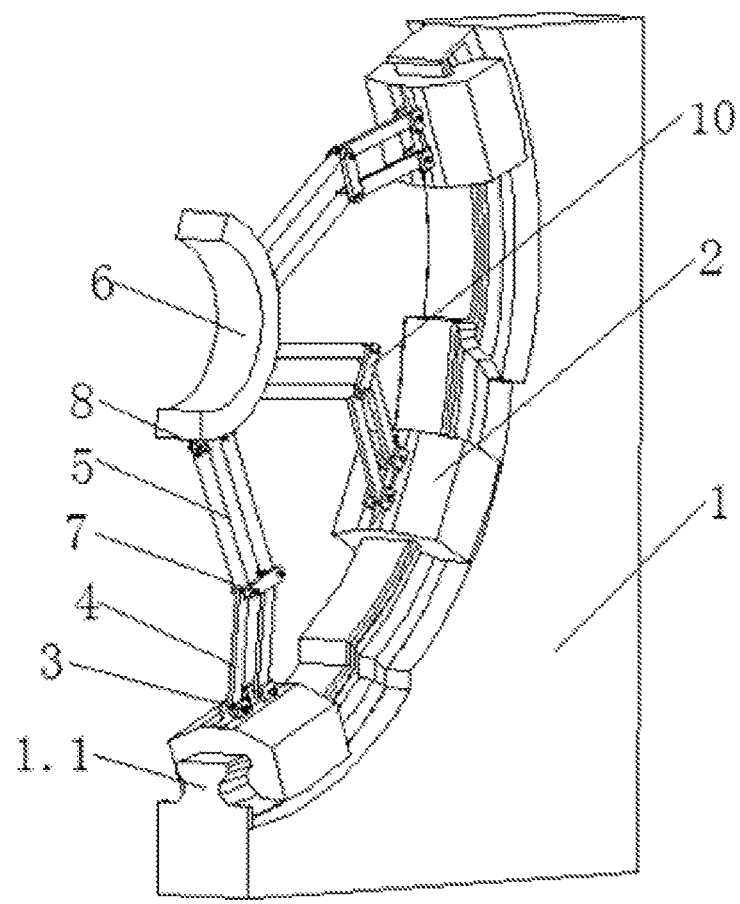
FIG. 1 is a schematic structural diagram according to the present invention.

Reference numerals: 1—stationary platform, 1.1—planar curved rail, 2—slider, 3—revolute joint I, 4—link bar I, 5—link bar II, 6—motion platform, 7—revolute joint II, 8—revolute joint III, 9—plane of motion, 10—link bar III.

DETAILED DESCRIPTION OF EMBODIMENTS

To make the inventive objectives, features, and advantages of the present invention clearer and more comprehensible, the technical schemes that the present invention seeks to protect is clearly and completely described below with reference to specific embodiments and the accompanying drawings. Apparently, the embodiments described below are merely some rather than all of the embodiments of the present invention. All other embodiments obtained by a person of ordinary skill in the art based on the embodiments of the present invention without creative efforts shall fall within the protection scope of the present invention.

As shown in FIG. 1, a single-layer three-section rail-type planar robot containing a double parallelogram, is composed of a stationary platform 1, a motion platform 6 and three branched chains with the same structure connecting the stationary platform 1 and the motion platform 6, characterized in that: the stationary platform 1 is provided with three planar curved rails 1.1, each planar curved rail 1.1 is connected to the motion platform 6 through a branched chain, and each branched chain includes a slider 2, two link bars I 4 arranged in parallel, two link bars II 5 arranged in parallel, and link bar III 10, the slider 2 is connected with a planar curved rail 1.1 in a sliding mode, the slider 2 is connected with one end of the two link bars I 4 by revolute joint I 3, the other end of the two link bars 4 is connected with the link bar III 10 by revolute joint II 7, both ends of the link bar III 10 are connected with the two link bars II 5 by revolute joint II 7, and the other end of the two link bars II 5 is connected with the motion platform 6 by revolute joint III 8; in a branched chain, the distance between the revolute joint I 3 and the revolute joint II 7 connected at both ends of one link bar I 4 is equal to that between the revolute joint I 3 and revolute joint II 7 connected at both ends of the other link bar I 4, and the distance between the revolute joint II 7 and the revolute joint III 8 connected at both ends of one link bar II 5 is equal to that between the revolute joint II 7 and the revolute joint III 8 connected at both ends of the other link bar II 5; the axes of the six revolute joints I 3 are parallel to each other, all perpendicular to the plane of motion 9 of the slider 2 relative to the planar curved rail 1.1; the axes of the six revolute joints II 7 are parallel to each other, perpendicular to the plane of motion 9 of the slider 2 relative to the planar curved rail 1.1; the axes of the six revolute joints III 8 are parallel to each other, perpendicular to the plane of motion 9 of the slider 2 relative to the planar curved rail I 1.1; select one revolute joint I 3 in each branched chain to form three revolute joints I 3 as the main driving joint or three sliders 2 as the driving parts; three planar curved rails 1.1 are arc-shaped, with different circle centers. Preferably, three planar curved rails 1.1 are circular arc-shaped, with different circle centers.

In this technical scheme, the three branched chains with the same structure refer to that the three branched chains include the same components and have the same connection relationships between the components. However, the same components in the three branched chains may have different sizes.

Figure 2:
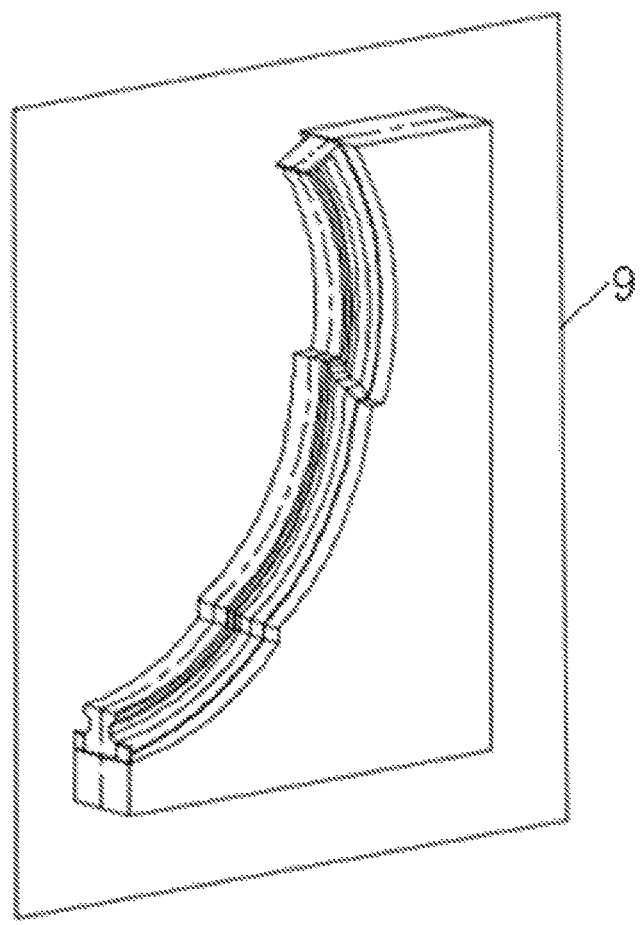
FIG. 2 is a schematic structural diagram one of a fixed platform.
Figure 3:
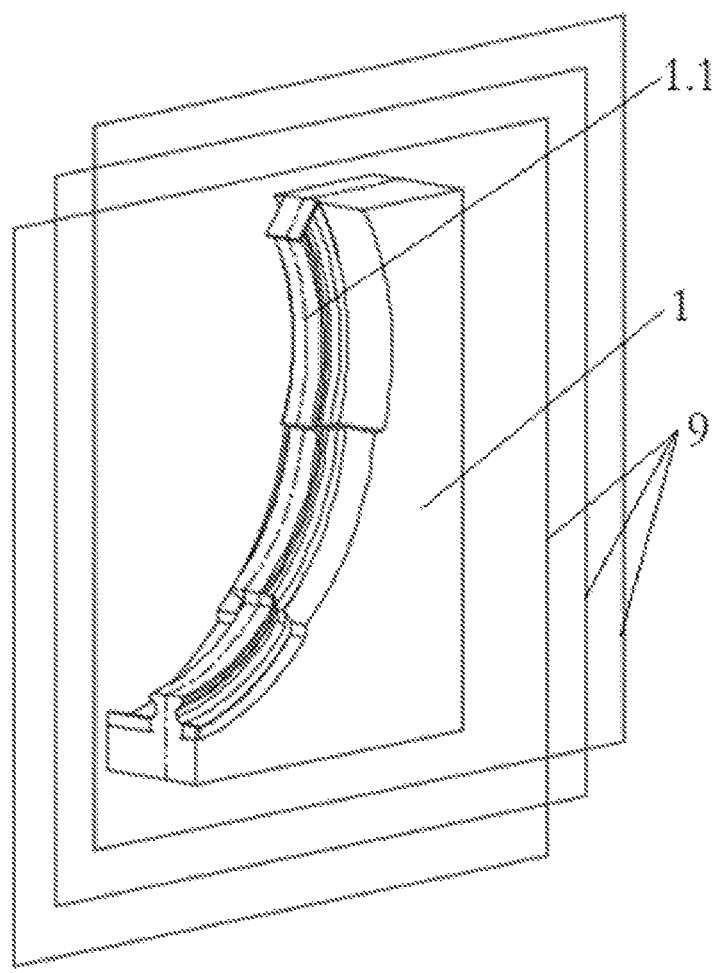
FIG. 3 is a schematic structural diagram two of a fixed platform.

As shown in FIGS. 2 and 3, three moving planes I 9 of the three sliders I 2 respectively relative to the three planar curved rails 1.1 are the same plane or parallel planes.

In this technical scheme, the planar curved rail 1.1, as implied by the name, is configured for the slider 2 to make a curved planar movement along the rail.

All embodiments are described in the present invention by using the progressive method. Each embodiment describes only the difference from other embodiments. For the same or similar parts among all embodiments, reference may be made to the relevant parts.

The foregoing description of the disclosed embodiments is presented to enable a person skilled in the art to implement or use the present invention. Various modifications to these embodiments are readily apparent to a person skilled in the art. The general principle defined herein may be implemented in other embodiments without departing from the spirit or scope of the present invention. Thus, the present invention is not to be limited to these embodiments shown herein, but are to be accorded with the broadest scope consistent with the principles, novel features, and creative characteristics disclosed herein.

What is claimed is:

1. A single-layer three-section rail-type planar robot containing a double parallelogram, comprising: a stationary platform (1), a motion platform (6) and three branched chains with the same structure connecting the stationary platform (1) and the motion platform (6);

wherein the stationary platform (1) is provided with three planar curved rails (1.1), each planar curved rail (1.1) is connected to the motion platform (6) through a branched chain, and each branched chain comprises a slider (2), two link bars I (4) arranged in parallel, two link bars II (5) arranged in parallel, and a link bar III (10), the slider (2) is connected with a planar curved rail (1.1) in a sliding mode, the slider (2) is rotatably connected with one end of the two link bars I (4) by a revolute joint I (3), another end of the two link bars I (4) is rotatably connected with the link bar III (10) by a revolute joint II (7), both ends of the link bar III (10) are rotatably connected with the two link bars II (5) by the revolute joint II (7), and other ends of the two link bars II (5) are rotatably connected with the motion platform (6) by revolute joints III (8);

wherein in a branched chain, a distance between the revolute joint I (3) and the revolute joint II (7) connected at both ends of one the two link bars I (4) is equal to a distance between the revolute joint 1 (3) and the revolute joint II (7) connected at both ends of other ones of the two link bars 1 (4), and a distance between the revolute joint II (7) and the revolute joint III (8) connected at both ends of one of the two link bars 11 (5) is equal to a distance between the revolute joint II (7) and the revolute joint III (8) connected at both ends of other ones of the two link bar II (5);

wherein axes of the two revolute joints 1 (3) are parallel to each other, all perpendicular to a plane of motion (9) of the slider (2) relative to the planar curved rail (1.1); axes of the two revolute joints II (7) are parallel to each other, perpendicular to the plane of motion (9) of the slider (2) relative to the planar curved rail (1.1); axes of the two revolute joints III (8) are parallel to each other, perpendicular to the plane of motion (9) of the slider (2) relative to the planar curved rail I (1.1);

Wherein one revolute joint I (3) is selected in each of the branched chain to form three revolute joints 1 (3) as a main driving joint or three sliders (2) as driving parts; the three planar curved rails (1.1) are arc-shaped with different circle centers;

wherein the three planar curved rails (1.1) are sequentially connected end to end along a same direction; and the three plane of motions (9) of the three sliders (2) respectively relative to the three planar curved rails (1.1) comprise: a first plane of motion, a second plane of motion, and a third plane of motion, and the first plane of motion, the second plane of motion, and the third plane of motion are different planes and parallel to each other.

2. The single-layer three-section rail-type planar robot containing a double parallelogram as claimed in claim 1, wherein the motion platform (6) is an arc-shaped platform and comprises: a first arc surface, the stationary platform (1) comprises: a second arc surface, and the first arc surface and the second arc surface are curved in a same direction;

wherein the three planar curved rails (1 .1) are disposed on the second arc surface of the stationary platform (1) and sequentially connected end to end along a circumferential direction of the second arc surface, and the other ends of the two link bars II (5) of the three branched chains are connected with the first arc surface of the motion platform (6) by the revolute joints III (8).

3. A single-layer three-section rail-type planar robot containing a double parallelogram, comprising:

a stationary platform (1), wherein the stationary platform (1) is provided with three planar curved rails (1.1) thereon;

three branched chains, disposed on three planar curved rails (1.1), respectively;

wherein each of the three branched chains comprises:
a slider (2), in sliding connection with the planar curved rail (1.1);
two link bars I (4), disposed in parallel; wherein each of the two link bars I (4) is rotatably connected to the slider (2) through a revolute joint I (3);
two link bars II (5), disposed in parallel; wherein the two link bars II (5) are rotatably connected to the respective link bars I (4) through revolute joints II (7); and
a link bar III (10), wherein the link bar III (10) is rotatably connected between the two link bars I (4) and the two link bars II (5) through the revolute joints II (7);

a motion platform (6), rotatably connected to ends of the two link bars II (5) facing away from the respective link bars I (4) through revolute joints III (8);

wherein the three planar curved rails (1.1) are sequentially connected end to end along a same direction; and the three sliders (2) of the three branched chains are capable of moving along the respective planar curved rails (1.1), and three plane of motions (9) of the three sliders (2) along the respective planar curved rails (1.1) comprise: a first plane of motion, a second plane of motion, and a third plane of motion, and the first plane of motion, the second plane of motion, and the third plane of motion are the same plane.

4. The single-layer three-section rail-type planar robot containing a double parallelogram as claimed in claim 3, wherein the motion platform (6) is an arc-shaped platform and comprises a first arc surface, the stationary platform (1) comprises a second arc surface, and the first arc surface and the second arc surface are curved in a same direction;

wherein the three planar curved rails (1.1) are disposed on the second arc surface of the stationary platform (1) and sequentially connected end to end along a circumferential direction of the second arc surface, and heights of the three planar curved rails (1.1) on the second arc surface of the stationary platform (1) are different; and other ends of the two link bars II (5) of the three branched chains are connected with the first arc surface of the motion platform (6) by the revolute joints ITT (8).

\* \* \* \* \*